(12) United States Patent
Ohama et al.

(10) Patent No.: US 7,264,559 B2
(45) Date of Patent: Sep. 4, 2007

(54) GOLF BALL

(75) Inventors: Keiji Ohama, Kobe (JP); Takashi Sasaki, Kobe (JP)

(73) Assignee: SRI Sports Ltd., Kobe (JP)

( * ) Notice: Subject to any disclaimer, the term of this patent is extended or adjusted under 35 U.S.C. 154(b) by 0 days.

(21) Appl. No.: 11/205,154

(22) Filed: Aug. 17, 2005

(65) Prior Publication Data
US 2006/0046871 A1    Mar. 2, 2006

(30) Foreign Application Priority Data
Sep. 1, 2004   (JP) ............................ 2004-253975

(51) Int. Cl.
*A63B 37/06* (2006.01)
(52) U.S. Cl. ..................................... 473/374
(58) Field of Classification Search ................. 473/351, 473/377, 373, 374
See application file for complete search history.

(56) References Cited

U.S. PATENT DOCUMENTS

| 5,553,852 A | 9/1996 | Higuchi et al. |
| 5,935,021 A | 8/1999 | Kashiwagi et al. |
| 6,610,772 B1 * | 8/2003 | Clauberg et al. ............ 524/445 |
| 6,794,447 B1 | 9/2004 | Kim et al. |
| 2003/0130061 A1 * | 7/2003 | Rajagopalan et al. ....... 473/354 |
| 2004/0092336 A1 * | 5/2004 | Kim et al. .................. 473/367 |
| 2006/0128505 A1 * | 6/2006 | Sullivan et al. ............. 473/371 |

FOREIGN PATENT DOCUMENTS

| JP | 2000-51396 A | 2/2000 |
| JP | 2000-70411 A | 3/2000 |

\* cited by examiner

*Primary Examiner*—Raeann Trimiew
(74) *Attorney, Agent, or Firm*—Birch, Stewart, Kolasch & Birch, LLP

(57) ABSTRACT

The golf ball includes a core, an intermediate layer for covering the core and a cover layer for covering the intermediate layer, wherein the cover layer is formed of a resin composition having a Shore D hardness of 52 or higher and the intermediate layer is formed of a resin composition containing a cation-treated phillosilicate and having a Shore D hardness of lower than 55. This combination provides the golf ball with an enhanced ball distance even in a slow swing speed as well as an improved shot feeling.

5 Claims, No Drawings

GOLF BALL

BACKGROUND OF THE INVENTION

1. Field of the Invention

The present invention relates to a golf ball having an excellent flight performance and a good shot feeling, and more specifically, relates to an improvement in a resin composition to be used for an intermediate layer of a multi-layered golf ball.

2. Description of the Related Art

As a base resin used in an outer layer for covering a core of a golf ball, such as a cover layer or an intermediate layer, ionomer resin and polyurethane are used. A thread-wound core or a vulcanized rubber-molded core is wrapped with a resin composition containing these resins as a main component.

In the above structure, in order to achieve a long ball distance, a cover layer is preferably formed as an outer layer having high hardness and high stiffness to provide high resilience. However, such a cover layer having high hardness and high stiffness has a problem that it tends to get cracked after repeated hits and thus its durability deteriorates.

As a countermeasure, a multi-layered golf ball in which an outer layer surrounding a core is constituted with a cover layer and an intermediate layer has been proposed (Japanese Patent Publication No. 2910516).

Meanwhile, a ball distance of a golf ball depends on an initial speed, launch angle and a spin rate. However, a combination of a cover layer having high hardness and high stiffness with an intermediate layer having low hardness makes it difficult for powerless aged players or female players to increase the initial speed due to their swings in a slow speed and also to raise the launch angle of the golf ball. Thus, a sufficiently long ball distance is not achieved.

In addition, in order to decrease the spin rate in the multi-layered golf ball described above, it is preferable to provide the golf ball having a hardness gradient with larger hardness from a core toward an outer layer. Consequently, a resin to be used for an intermediate layer is softer than that for a cover layer, making it further unfavorable to improve the ball distance.

On the other hand, when both an intermediate layer and a cover layer have high hardness in order to improve a ball distance, such hard layers cause poor shot feeling and thus the above-mentioned players give low evaluation for such golf ball.

In an attempt to solve the problems described above, it has been proposed to include fibrous aluminum borate whiskers or the like in a cover layer (Japanese Laid-Open Patent Publication No. 10-137365). However, these fibrous substances have small specific surface areas. Because of such properties, although the fibrous substances are easily dispersed, the large-sized reinforcing materials come to scatter over the resin. Thus, when dispersed in the resin, the reinforcing materials have a small reinforcing effect. Therefore, in order to satisfy a desired mechanical property, it is required to blend a large amount of such materials. As a result, since the resin content in the resin composition is reduced, neither the high resilience being important as a golf ball nor the durability at a desired level is achieved.

Further, as an improvement for an intermediate layer, it has been proposed to include inorganic fillers such as barium sulfate and titanium white in order to enhance the resilience of the intermediate layer having low hardness (Japanese Laid-Open Patent Publication No. 2000-51396 and Japanese Laid-Open Patent Publication No. 2000-70411). However, since these fillers are not easily dispersed in the resin and the inorganic fillers raise the hardness, the shot feeling is lowered.

As a reinforcing material other than those described above, it has also been proposed to add nanocomposite material such as hydrotalcite or octosilicate as a filler into a resin composition (Japanese National Publication No. 2004-504900). Since the fillers of these types are formed into nano-sized fine particles, they are hard to be dispersed into resins. In particular, such fillers are difficult to be dispersed as particles into hydrophobic resins such as ionomer resin and polyurethane to be used for an intermediate layer. As a result, agglomerated particles are unevenly located in the resin, as is the case of the reinforcing materials having large particle diameters. Therefore, it has become apparent that, even if these reinforcing materials are used, it is impossible to obtain the properties of desired levels.

SUMMARY OF THE INVENTION

Even in the multi-layered golf ball having the cover layer with high hardness and high stiffness as well as high resilience, it was so far difficult to satisfy both excellent flight performance and preferable shot feeling simultaneously which are fitted for the players swinging in a slow speed.

It is an object of the present invention to provide a golf ball which has an enhanced ball distance in a slow swing speed and is simultaneously excellent in shot feeling by improving a resin composition for an outer layer, while achieving a long ball distance by using a resin composition with high hardness and high stiffness for a cover layer.

The golf ball of the present invention comprises a core, an intermediate layer for covering the core and a cover layer for covering the intermediate layer, and the cover layer is formed of a first resin composition having a Shore D hardness of 52 or higher and the intermediate layer is formed of a second resin composition containing a cation-treated phillosilicate and having a Shore D hardness of lower than 55. Specifically, the cover layer is made of the first resin composition having high hardness of 52 or higher to provide with excellent resilience, and the intermediate layer is made of a soft resin composition having low hardness of lower than 55 as well as containing the cation-treated phillosilicate. Since the cation-treated phillosilicate is satisfactorily dispersed in the resin composition, the cation-treated phillosilicate can sufficiently exhibit its property as the fine particles.

DESCRIPTION OF THE PREFERRED EMBODIMENTS

Hereinafter, the present invention will be described in detail.

A phillosilicate of the present invention is, for example, silicate having a structure of $[(Si_2O_5)^{2-}]_n$, and specific examples thereof include: mica such as white mica and black mica that are generally referred to as clay minerals; clays such as bentonite containing smectite, kaolinite, and montmorillonite as main components; talc; and chlorite. Among them, bentonite is preferable because it easily turns into fine particles in the form of single leaf, and the most preferable is montmorillonite obtained by purifying bentonite.

The phillosilicate described above is in the form of nano-sized fine particles of which primary particles has a thickness of 10 nm or smaller and each of which shape is like a flat plate having a length and a width of 1 μm or smaller respectively. Due to this structure and the size, when the phillosilicate in the form of very fine particles is satisfactorily dispersed into a resin, it has advantages not only to exhibit a sufficient effect as a reinforcing material but also to decrease an amount thereof required for use. Therefore, if the phillosilicate in the form of fine particles can be uniformly dispersed into a resin such as polyurethane, the property of the resin is less impaired. The size of a primary particle of the phillosilicate is not specifically limited as far as it is 1 μm or smaller. The size thereof is preferably 700 nm or smaller and more preferably 500 nm or smaller, and 10 nm or larger and more preferably 50 nm or larger. Further, the primary particle of the phillosilicate in the form of single leaf exhibits its sufficient effect as far as its thickness is 10 nm or smaller. In order the primary particle to disperse in the form of single leaf into a resin composition, however, it is preferable that the phillosilicate has a thickness of 0.1 nm or larger and more preferably a thickness ranging between 0.5 nm or larger and 5.0 nm or smaller.

In general, the phillosilicate described above exists in a state in which the particles aggregate with each other by an electrostatic force and van der Waals force to form secondary particles. Since an untreated phillosilicate has by nature high hydrophilic property in the form of particles alone, it has very excellent dispersibility into water and immediately swells in an aqueous solution. However, when a reinforcing material is mixed with a resin for a golf ball to produce a resin composition for an outer layer, the reinforcing material is required to be fully blended with ionomer resin or polyurethane for example. In this case, there arises a problem that the untreated phillosilicate is not dispersed sufficiently.

To solve such a problem, in the present invention, a cation-treated phillosilicate is used in order to achieve a state in which the cation-treated phillosilicate is dispersed to near primary particles in the form of single leaf into a resin composition.

Although it is unclear why the affinity with the resin is improved by performing the cation treatment to the phillosilicate, the reason may be considered as follows: The phillosilicate having by nature high hydrophilic property turns into that having lipophilic property by the cation located on the surface thereof. This cation treatment serves to enhance the affinity of the phillosilicate with the resin. In particular, the cation-treated phillosilicate can be satisfactorily dispersed even when used together with a resin having high hydrophobic property, thereby producing a resin composition in which the cation-treated phillosilicate is uniformly dispersed in the resin.

Further, if an intermediate layer is formed of thus-prepared resin composition for example, the resultant intermediate layer has high anisotropy that is achieved by changing the balance of the elasticity modulus between in a compressing direction and in a stretching direction. Specifically, the elasticity modulus in a compressing direction becomes higher in the intermediate layer as compared with the case where the intermediate layer is formed of a resin alone, so that resilience force can be enhanced. In addition, an increased amount in the elasticity modulus in a stretching direction becomes larger than that in a compressing direction. This leads to an achievement of higher anisotropy in the balance of the elasticity modulus between in a stretching direction and in a compressing direction, as compared with the case of a resin alone. As a result, the intermediate layer formed of the resin composition of the present invention quickly recovers from the deformation by hit, thereby suppressing spin rate and increasing a ball distance.

According to the present invention, the intermediate layer having low hardness is formed desiring a good shot feeling. Since, even if the intermediate layer contains the phillosilicate, an increase of hardness is suppressed through the shape of the particles thereof, both the shot feeling and the ball distance can be improved simultaneously.

It is unclear why the balance of the elasticity modulus between in the compressing direction and in the stretching direction changes. However, it is imagined as follows: Since the dispersed cation-treated phillosilicate of the present invention is dispersed to near primary particles in the form of flat plate like single leaf, it is likely to align in parallel to a circumferential direction of a ball along the flowing direction of the resin composition in a molding step. Thus, in the thickness direction of the intermediate layer, the elasticity modulus in the compressing direction increases to be higher than that of the case where the resin composition is composed of a resin alone, whereas an increasing amount of the elasticity modulus in the compressing direction is suppressed to be lower than that in the stretching direction. Accordingly, it is assumed that the nature of high hardness of the cation-treated phillosilicate appears in the stretching direction and the nature of the softness of the resin appears in the compressing direction.

In particular, when a resin having high polarity such as polyurethane is used in order to provide a soft shot feeling, a dispersion of the untreated phillosilicate into the resin is likely to be insufficient because the untreated phillosilicate is inherently hydrophilic. However, the cation-treated phillosilicate of the present invention has the advantage that it satisfactorily disperses even in such a highly polar resin.

Examples of the cation to be used for the cation-treated phillosilicate of the present invention include those that provide the phillosilicate with an affinity with a resin. For example, cations of alkaline metals such as sodium ion and potassium ion, or cations of alkaline earth metals such as calcium ion and barium ion may be used. However, especially preferable is quaternary ammonium salt.

It is preferable that the quaternary ammonium salt has substituent groups at least one of which is at least one selected from the group consisting of an aromatic hydrocarbon group and a carboxylic group, and more preferable is the quaternary ammonium salt which has both of these substituent groups. The use of the quaternary ammonium salt having these substituent groups imparts a high polarity to the phillosilicate so that the cation-treated phillosilicate easily disperses in the polar resin.

Examples of the aromatic hydrocarbon group include benzene derivative groups such as benzyl group, phenethyl group, tolyl group, xylyl group, diphenylmethyl group, and trityl group. Among them, benzyl group is preferable.

Further, the carboxylic group may be either aromatic or aliphatic. Examples of the preferable carboxylic group include, for example, carboxylic acid groups such as stearic acid group, myristic acid group, palmitic acid group, oleic acid group, and lauric acid group. Examples of proper carboxylic groups which are commercially available in the market include fats and oils group such as beef tallow fatty acid group.

Preferable examples of other substituent groups of the quaternary ammonium salt include linear or branched, saturated or unsaturated aliphatic hydrocarbon groups having 1-4 carbon atoms, for example, alkyl group such as methyl group, ethyl group, propyl group, butyl group, and isopropyl group. The substituent groups may have double bonds like an unsaturated aliphatic hydrocarbon group. Further, the substituent groups may have a heterocyclic structure in which two or more substituent groups form a ring.

The method for performing the cation treatment to the phillosilicate is not specifically limited. Preferable examples thereof include a method in which the phillosilicate is cation-treated before mixed with a resin. Although the phillosilicate may be cation-treated at the time when a resin composition is prepared, it is preferable that the phillosilicate is cation-treated before mixed with a resin. If the phillosilicate is subjected to cation treatment beforehand, the whole particles thereof are uniformly cation-treated and the time required for the dispersion when mixed with a resin can be also shortened. Therefore, it is preferable that the entire surfaces of the particles of the phillosilicate are completely cation-treated. However, it is also possible to optionally modify the method taking the dispersibility into the resin to be used into consideration.

Examples of the cation-treated phillosilicate described above include: Dellite (trade name) 43B (purified montmorillonite, including particles with 500 nm in diameter and 1 nm in thickness, treated with quaternary ammonium salt: quaternary ammonium salt having benzyl group, beef tallow fatty acid group and two methyl groups); Dellite (trade name) 67G (purified montmorillonite, including particles with 500 nm in diameter and 1 nm in thickness, treated with quaternary ammonium salt: quaternary ammonium salt having two beef tallow fatty acid groups and two methyl groups); and Dellite (trade name) HPS (purified montmorillonite, including particles with 500 nm in diameter and 1 nm in thickness, treated with Na cation), all of which are manufactured by Laviosa Chimica Mineraria S.p.A. Such cation-treated phillosilicate is in the form of secondary particles of about several microns due to aggregation before dispersed into a resin. However, due to an affinity with a resin, such cation-treated phillosilicate can be dispersed to near primary particles in the form of single leaf into a resin. Therefore, the cation-treated phillosilicate of the present invention is also excellent in handling at the time of preparing a resin composition.

Next, a method for manufacturing a golf ball by using the resin composition of the present invention in the intermediate layer for the outer layer will be described.

An intermediate layer of the golf ball of the present invention is formed by molding a resin composition for an intermediate layer containing a resin component as a base material and the cation-treated phillosilicate. The amount of the cation-treated phillosilicate to be blended into the resin composition for the intermediate layer is not specifically limited. The content is, however, preferably 1 part by mass or more, and more preferably 2 parts by mass or more, and still more preferably 3 parts by mass or more, and 30 parts by mass or less, and more preferably 20 parts by mass or less, and still more preferably 10 parts by mass or more, with respect to 100 parts by mass of the resin component. After being dispersed into the resin, the cation-treated phillosilicate of the present invention exists in the resin as fine particles in the form of single leaf. Therefore, improvement in the intermediate layer can be achieved even in the small amount of the cation-treated phillosilicate with respect to the resin component as described above.

The resin component in the resin composition for the intermediate layer is not specifically limited, and examples thereof include polyurethane, ionomer resin, polyamide, polyester, polyolefin, polystyrene-based elastomers, and mixtures thereof. It is preferable to select polyurethane or ionomer resin as the main component of the resin component. The content of the polyurethane or ionomer resin in the resin component is preferably 50 mass % or more, and more preferably 70 mass % or more, and still more preferably 90 mass % or more. It is also preferable that the resin component consists essentially of polyurethane or ionomer resin.

The resin composition for the intermediate layer of the present invention has preferably a Shore D hardness of lower than 55, and more preferably 48 or lower, and the most preferably 45 or lower, in order to obtain a soft shot feeling. On the other hand, in order to enhance resilience, the Shore D hardness is preferably 20 or higher, and more preferably 30 or higher, and the most preferably 40 or higher. The hardness of 55 or higher makes the shot feeling hard, because it approaches the vicinity of the hardness of the cover layer.

The resin composition having such low hardness can be prepared by properly changing the resin component, its amount to be used and the amount of the cation-treated phillosilicate to be blended, respectively within the range described above. In particular, the use of polyurethane as a base resin makes it easy to decrease the hardness of the resin component itself and therefore, polyurethane is preferably used.

The above-described intermediate layer having the low hardness makes it possible to provide an inside of a golf ball with a softer layer as compared with the cover layer and hence, imparts an improved shot feeling to the golf ball. In addition, the cation-treated phillosilicate in the intermediate layer serves to suppress an increase of the hardness in a compressing direction as well as to enhance the hardness in a circumferential direction and therefore, contributes to an improvement of a ball distance as compared with a conventional reinforcing material.

The intermediate layer of the present invention has preferably a thickness of 0.5 mm or more and 2.5 mm or less, and more preferably a thickness of 0.8 mm or more and 2.0 mm or less.

It is preferable that the intermediate layer made of theresin composition containing the cation-treated phillosilicate of the present invention provides not only the low hardness but also high anisotropy to the balance between the compressing direction (i.e. a diameter direction of the ball) and the stretching direction (i.e. a circumferential direction of the ball) when hit. The increased anisotropy suppresses a spin rate of the ball, achieves a high launch angle, and increases a ball distance. Specifically, if the intermediate layer is made of a resin component alone, it is hard to achieve a high ratio between the elasticity modulus in the compressing direction and the elasticity modulus in the stretching direction. The same disadvantage arises even in the case of using a resin composition including a reinforcing material with the spherical shape or isotropic shape such as cubic added thereto. Although the addition of such a reinforcing material increases the elasticity moduli in the respective directions, the contributions of elasticity moduli to the respective directions are almost the same each other. Thus, the change in the balance between the elasticity modulus in the compressing direction and the elasticity modulus in the stretching direction is small.

Contrary to the above, in the present invention, the cation-treated phillosilicate which can be dispersed in the resin in the form of single leaf is used. Due to the particle shape of the cation-treated phillosilicate, although no remarkable increase in the elasticity modulus is produced in the compressing direction of the ball as compared with the case of using a resin alone, a large increase in the elasticity modulus is produced in the stretching direction in contrast to the compressing direction. Therefore, it is believed to be possible to form an intermediate layer having a balance of elasticity moduli with high anisotropy. Thus-formed intermediate layer enables the ball to recover rapidly from the deformation applied thereto when hit, to reduce the spin rate, and to enhance the ball distance.

In the present invention, from the above viewpoint, it has also been found that an increased ball distance is achieved when, defining the elasticity modulus in the stretching direction and the elasticity modulus in the compressing direction at the resin portion of the resin composition excluding the cation-treated phillosilicate in the intermediate layer as $\alpha_A$ and $\beta_A$ respectively, and the elasticity modulus in the stretching direction and the elasticity modulus in the compressing direction at the resin composition containing the cation-treated phillosilicate in the intermediate layer as $\alpha_B$ and $\beta_B$ respectively, the balance between these elasticity moduli of the intermediate layer is set in such a manner that the value of $\alpha_B/\beta_B$ is larger than 1.1, and more preferably 1.2 or more, and the most preferably 1.3 or more with respect to the value of $\alpha_A/\beta_A$.

It is preferable that the elasticity modulus in the stretching direction is as high as possible, because the balance between the elasticity moduli in these directions has the increased tendency of anisotropy as the elasticity modulus in the stretching direction is higher. However, in order to satisfy both of the resilience and the shot feeling, the balance is preferably 2.0 or less, and more preferably 1.8 or less, and the most preferably 1.6 or less.

The elasticity moduli are properly changeable in accordance with the kinds of the resin components to be used for the intermediate layer and the amount of the cation-treated phillosilicate. When polyurethane is used as a base resin component, the elasticity modulus in the compressing direction of the resin portion of the resin composition is preferably 20 MPa or higher and 500 MPa or lower, and more preferably 30 MPa or higher and 400 MPa or lower, and the most preferably 50 MPa or higher and 350 MPa or lower.

Similarly, the elasticity modulus in the stretching direction of the resin portion of the resin composition is preferably 100 MPa or higher and 2500 MPa or lower, and more preferably 150 MPa or higher and 2000 MPa or lower, and the most preferably 180 MPa or higher and 1800 MPa or lower.

Each of the elasticity modulus of the intermediate layer can be obtained by producing a resin molded piece having the same composition of the resin component used in the intermediate layer, if it is difficult to measure the elasticity modulus directly.

The elasticity modulus of the intermediate layer made of a resin composition containing the above-described polyurethane as a resin component and the cation-treated phillosilicate is preferably 30 MPa or higher and 600 MPa or lower in the compressing direction, and more preferably 40 MPa or higher and 500 MPa or lower, and the most preferably 55 MPa or higher and 400 MPa or lower. Similarly, the elasticity modulus in the stretching direction is preferably 150 MPa or higher and 3000 MPa or lower, and more preferably 200 MPa or higher and 2500 MPa or lower, and the most preferably 250 MPa or higher and 2300 MPa or lower.

The intermediate layer may comprise one or more layers, and when the intermediate layer has two or more layers, at least one intermediate layer may contain the cation-treated phillosilicate.

Polyurethane to be used as a resin component of the resin composition for the intermediate layer is not specifically limited as far as it has a plurality of urethane bonds in its molecules. Examples of such polyurethane include a product in which polyisocyanate and polyol are reacted with each other to form urethane bonds in the molecules. Or alternatively, a product obtained from further reaction with polyamine may be included, if necessary. Examples of such polyurethane include thermoplastic polyurethane and thermosetting (two-pack type) polyurethane.

The polyurethane generally contains a polyisocyanate component and a polyol component, and if necessary, further contains a polyamine component. The polyisocyanate component is not specifically limited as far as it has two or more isocyanate groups, and examples thereof include one selected from the group consisting of: aromatic polyisocyanates such as 2,4-toluenediisocyanate, 2,6-toluenediisocyanate, a mixture of 2,4-toluenediisocyanate and 2,6-toluenediisocyanate (TDI), 4,4'-diphenylmethanediisocyanate (MDI), 1,5-naphthylenediisocyanate (NDI), 3,3'-bitolylene-4,4'-diisocyanate (TODI), xylylenediisocyanate (XDI), tetramethylxylylenediisocyanate (TMXDI), paraphenylenediisocyanate (PPDI), and the like; alicyclic polyisocyanates or aliphatic polyisocyanates such as 4,4'-dicyclohexylmethanediisocyanate ($H_{12}$MDI), hydrogenated xylylenediisocyanate ($H_6$XDI), hexamethylenediisocyanate (HDI), isophoronediisocyanate (IPDI), and the like; or a mixture of two or more of them.

It is preferable to use aromatic polyisocyanates as a polyisocyanate component of the polyurethane. By use of aromatic polyisocyanates, the resultant polyurethane generates an intermediate layer having an enhanced mechanical property. Further, from the viewpoint of enhancement in the weather resistance, it is preferable to use non-yellowing polyisocyanates (TMXDI, XDI, HDI, $H_6$XDI, IPDI, $H_{12}$MDI and the like) as a polyisocyanate component of the polyurethane, and more preferably 4,4'-dicyclohexylmethanediisocyanate ($H_{12}$MDI). Since 4-4'-dicyclohexylmethanediisocyanate ($H_{12}$ MDI) has a rigid structure, the use thereof as a source of polyurethane produces an intermediate layer excellent in a mechanical property.

A polyol component that constitutes the polyurethane is not specifically limited as far as it has a plurality of hydroxyl groups, and examples thereof include low molecular weight polyols and high molecular weight polyols. Examples of low molecular weight polyols include: diols such as ethylene glycol, diethylene glycol, triethylene glycol, 1,3-butanediol, 1,4-butanediol, neopentyl glycol, 1,6-hexanediol, and the like; and triols such as glycerin, trimethylol propane, hexanetriol, and the like. Examples of high molecular weight polyols include: polyether polyols such as polyoxyethyleneglycol (PEG), polyoxypropyleneglycol (PPG), polyoxytetramethyleneglycol (PTMG), and the like; condensed polyester polyols such as polyethyleneadipate (PEA), polybutyleneadipate (PBA), polyhexamethyleneadipate (PHMA); lactone-typed polyesterpolyols such as poly-ϵ-caprolactone (PCL), and the like; polycarbonate polyols such as polyhexamethylenecarbonates; and acryl polyols, or alternatively a mixture of two or more of these polyols.

An average molecular weight of the high molecular weight polyols is not specifically limited, and is preferably 400 or more, and more preferably 1000 or more. If the average molecular weight of the high molecular weight polyols is too small, the resultant polyurethane is too much hard, resulting in bad shot feeling of the golf ball. The upper limit of the average molecular weight of the high molecular weight polyols is not specifically limited, and is preferably 10000 or less, and more preferably 8000 or less.

A polyamine component that constitutes the polyurethane if necessary is not specifically limited as far as it has at least two or more amino groups. Examples of the polyamine include: aliphatic polyamines such as ethylenediamine, propylenediamine, butylenediamine, hexamethylenediamine, and the like; alicyclic polyamines such as isophoronediamine, piperazine, and the like; and aromatic polyamines.

The aromatic polyamines are not specifically limited as far as they include at least two or more amino groups directly or indirectly bonded to aromatic rings. Here, an indirect bonding means that amino groups bonds to aromatic rings via lower alkylene groups, for example. The aromatic polyamines may be monocyclic aromatic polyamines in which two or more amino groups bonds to one aromatic ring, or may be polycyclic aromatic polyamines including two or more aminophenyl groups each in which at least one amino group bonds to one aromatic ring.

Examples of the monocyclic aromatic polyamines include: those in which amino groups directly bond to aromatic rings such as phenylenediamine, toluenediamine, diethyltoluenediamine, and dimethylthioltoluenediamine; and those in which amino groups bonds to aromatic rings via lower alkylene groups such as xylylenediamine. Further, the polycyclic aromatic polyamines may be poly(aminobenzene) in which at least two amino phenyl groups directly bonds to each other, or alternatively, at least two amino phenyl groups bonds to each other via lower alkylene groups or alkylene oxide groups. Among them, preferable is diaminodiphenylalkane in which two amino phenyl groups bonds to each other via lower alkylene groups, and particularly preferable are 4,4'-diaminodiphenylmethane and its derivatives.

The thermoplastic polyurethane and thermosetting polyurethane (two-pack type polyurethane) which may be used as a resin component of the resin composition for the intermediate layer can be prepared by properly combining the polyisocyanates, polyols, and polyamines with each other. Examples of the method for preparing the polyurethane include a one-shot method and a prepolymer method. The one-shot method is a method in which polyisocyanates and polyols are reacted with each other at one time. The prepolymer method is a method in which polyisocyanates and polyols are reacted with each other in plural steps, for example, a method in which a low molecular weight urethane prepolymer is prepared and subsequently further polymerized to high molecular polyurethane.

The thermoplastic polyurethane is generally prepared by the above-described method as a high molecular polyurethane polymerized to some extent. The thermosetting polyurethane (two-pack type polyurethane) is prepared by synthesizing the low molecular weight urethane prepolymer, and further polymerizing the low molecular weight urethane prepolymer to high molecular polyurethane by adding a chain-extending agent (or a curing agent) at the time of forming the intermediate layer by molding. In preparing polyurethane, a known catalyst may be used. Examples of the catalyst include: monoamines such as triethylamine, N,N-dimethylcyclohexylamine, and the like; polyamines such as N,N,N',N'-tetramethylethylenediamine, N,N,N',N",N"-pentamethyldiethylenetriamine, and the like; cyclic diamines such as 1,8-diazabicyclo-[5,4,0]-7-undecene (DBU), triethylenediamine; tin-based catalysts such as dibutyl tin dilaurylate, dibutyl tin diacetate, and the like.

In the present invention, it is preferable to use thermoplastic polyurethane, and thermoplastic polyurethane elastomer is more preferable as a resin component of the resin composition for the intermediate layer. The thermoplastic polyurethane elastomer is polyurethane which exhibits so-called rubber elasticity. The employment of the thermoplastic polyurethane elastomer provides the intermediate layer with high resilience. The thermoplastic polyurethane elastomer is not specifically limited as far as it can be molded into the intermediate layer by an injection molding or a compression molding, and "Elastolan XNY90A", "Elastolan XNY97A", "Elastolan XNY585" and the like commercially available from BASF Polyurethane Elastomers Co., Ltd. may be used.

The thermoplastic polyurethane and the thermoplastic polyurethane elastomer are not specifically limited, and examples thereof include: those containing a polyisocyanate component and a high molecular weight polyol component as constituents; those containing a polyisocyanate component, a high molecular weight polyol component, and a low molecular weight polyol component as constituents; those containing a polyisocyanate component, a high molecular weight polyol component, a low molecular weight polyol component, and a polyamine component as constituents; those containing a polyisocyanate component, a high molecular weight polyol component, and a polyamine component as constituents, and the like.

In the present invention, it is also preferable to use thermosetting polyurethane as a resin component of the resin composition for the intermediate layer. Since thermosetting polyurethane is capable of creating a large number of three-dimensional cross-linking points, it provides the intermediate layer with excellent durability. An example of such thermosetting polyurethane includes, for example, a type curing an isocyanate group-terminated urethane prepolymer with a curing agent such as polyamine and polyol. An alternative example thereof includes a type curing a hydroxyl group- or an amino group-terminated urethane prepolymer with a curing agent such as polyisocyanate. The polyamine, polyol or polyisocyanate to be used as a curing agent may be properly selected among those described above.

Among them, preferable is thermosetting polyurethane which is obtained by curing an isocyanate group-terminated urethane prepolymer with polyamine. In this case, it is desirable to set the molar ratio of the amino groups in the curing agent with respect to the isocyanate groups in urethane prepolymer ($NH_2/NCO$) to 0.70 or higher, and more preferably 0.80 or higher, and still more preferably 0.85 or higher, and to 1.20 or lower, and more preferably 1.05 or lower, and still preferably 1.00 or lower. At the molar ratio of less than 0.70, the amount of an isocyanate group-terminated urethane prepolymer with respect to polyamine is excessive, thus the allophanate and buret cross-linking reaction tends to generate excessively. As a result, the finally obtained polyurethane tends to have poor flexibility. On the other hand, at the molar ratio of higher than 1.20, the amount of isocyanate groups is short, thus the allophanate and buret cross-linking reaction is hard to occur. As a result, the number of the three-dimensional cross-linking points becomes too small and the finally obtained thermosetting polyurethane tends to have low strength.

In the present invention, it is also preferable to use ionomer resin as a resin component of the resin composition for the intermediate layer. Examples of the ionomer resin include: that obtained by neutralizing at least a part of carboxyl groups in a binary copolymer of ethylene and $\alpha,\beta$-unsaturated carboxylic acid with a metal ion; and that obtained by neutralizing at least a part of carboxyl groups in a ternary copolymer of ethylene, $\alpha,\beta$-unsaturated carboxylic acid, and $\alpha,\beta$-unsaturated carboxylic ester with a metal ion.

Preferable examples of the α,β-unsaturated carboxylic acid include: acrylic acid, methacrylic acid, fumaric acid, maleic acid, crotonic acid, and the like, and especially preferable is acrylic acid or methacrylic acid. Examples of α,β-unsaturated carboxylic ester include methyl, ethyl, propyl, n-butyl, isobutyl ester of acrylic acid, methacrylic acid, fumaric acid, maleic acid, and the like, and especially preferable is esters of acrylic acid or of methacrylic acid. Examples of the metal ion which neutralizes at least a part of carboxyl groups in the binary copolymer of ethylene and α,β-unsaturated carboxylic acid or in the ternary copolymer of ethylene, α,β-unsaturated carboxylic acid and α,β-unsaturated carboxylic ester include: alkaline metal ions such as sodium, potassium, and lithium; bivalent metal ions such as magnesium, calcium, zinc, barium, and cadmium; trivalent metal ions such as aluminum; and other ions such as tin and zirconium. Among them, sodium, zinc, and magnesium ions are especially preferably used because they achieve high resilience and durability.

Specific examples of the ionomer resin include: Himilan 1555, 1557, 1605, 1652, 1702, 1705, 1706, 1707, 1855, 1856 (manufactured by Dupont-Mitsui Polychemical Co.); Surlyn 8945, Surlyn 9945, Surlyn 6320 (manufactured by Dupont Co.); and IOTEK 7010, 8000 (manufactured by Exxon Co.). These inomer resins may be used alone or may be used as a mixture in combination of two or more of them.

As a resin component of the resin composition for the intermediate layer in the present invention, it is preferable to additionally use thermoplastic elastomer, diene-based block copolymer, or the like in addition to the base material resin such as the thermoplastic polyurethane or the ionomer resin. Specific examples of the thermoplastic elastomer include: thermoplastic polyamide elastomer commercially available from Toray Industries Inc. under the trade name of "Pebax" (for example, "Pebax 2533"); thermoplastic polyester elastomer commercially available from Toray-Dupont Co. under the trade name of "Hytrel" (for example, "Hytrel 3548" and "Hytrel 4047"); thermoplastic polyurethane elastomer commercially available from BASF Polyurethane Elastomers Co. under the trade name of "Elastolan" (for example, Elastolan ET880); thermoplastic styrene-based elastomer commercially available from Mitsubishi Chemical Co. under the trade name of "Rabalon" (for example, "Rabalon SR04" and "Rabalon T3339C"), and the like.

The diene-based block copolymer has double bonds derived from a conjugated diene compound of a block copolymer or a partially hydrogenated block copolymer. The block copolymer to be a base thereof is a block copolymer including a polymer block A containing at least one vinyl aromatic compound as a main component and a polymer block B containing at least one conjugated diene compound as a main component. The partially hydrogenated block copolymer is obtained by hydrogenating the block copolymer described above. As the vinyl aromatic compound which constitutes the block copolymer, one or two or more may be selected from the group consisting of styrene, α-methylstyrene, vinyltoluene, p-t-butylstyrene, 1,1-diphenylstyrene, and the like, and among them, styrene is preferable. As the conjugated diene compound, one or two or more may be selected from the group consisting of butadiene, isoprene, 1,3-pentadiene, 2,3-dimetyl-1,3-butadiene, and the like, and among them, butadiene, isoprene, and a combination thereof are preferable. Examples of preferable diene-based block copolymer include a block copolymer having a styrene-butadiene-styrene (SBS) structure having a polybutadiene block containing epoxy groups, and a block copolymer having a styrene-isoprene-styrene (SIS) structure containing epoxy groups.

Specific examples of the diene-based block copolymer include: "Epofriend A1010" manufactured by Daicel Chemical Industries, Co., Ltd.; and "Septon HG-252" manufactured by Kuraray Co., Ltd. The amount of the thermoplastic elastomer or the diene-based block copolymer to be blended is preferably 1 to 60 parts by mass, and more preferably 1 to 35 parts by mass with respect to 100 parts by mass of the base material resin.

The golf ball of the present invention is not limited to a specific structure as far as it includes a core, an intermediate layer covering the core and a cover layer covering the intermediate layer, and examples thereof include: a multi-piece golf ball including a core, at least one layer of intermediate layer for covering the core and a cover layer for covering the intermediate layer; and a thread-wound golf ball including a thread-wound core, an intermediate layer for covering the thread-wound core and a cover layer for covering the intermediate layer. Since a cover layer as well as an intermediate layer composes an outer layer surrounding a core, it is defined in the present invention for convenience that a cover layer is composed of one layer and an intermediate layer is positioned between the cover layer and the core.

Hereinafter, a method for manufacturing a multi-layered golf ball including the intermediate layer will be described. It should be noted that the present invention is not limited to this manufacturing method. As a core of the multi-layered golf ball of the present invention, any conventionally known core may be used, and for example, a preferable core is obtained by hot-press molding a rubber composition for a core containing a base rubber, co-cross-linking agent, organic peroxide, and a filler.

As the base rubber, natural rubber and/or synthetic rubber may be used, and for example, polybutadiene rubber, natural rubber, polyisoprene rubber, styrene-polybutadiene rubber, ethylene-propylene-diene rubber (EPDM) may be used. Among them, it is preferable to use high-cis-polybutadiene rubber having a cis-isomer content of 40% or more, and preferably 70% or more, and more preferably 90% or more, as it provides a golf ball advantageous in resilience.

As the co-cross-linking agent, an α,β-unsaturated carboxylic acid having 3-8 carbon atoms or its metallic salt may be used, and examples thereof include acrylic acid, methacrylic acid or metallic salts thereof. Examples of the metals constituting the metallic salts include zinc, magnesium, calcium, aluminum, sodium, and it is preferable to use zinc because the resilience is increased. It is desirable that the amount of the co-cross-linking agent to be used is 10 parts by mass or more, and more preferably 20 parts by mass or more, and 50 parts by mass or less, and more preferably 40 parts by mass or less with respect to 100 parts by mass of the base rubber. If the amount of the co-cross-linking agent is less than 10 parts by mass, it is required to increase the amount of an organic peroxide in order to achieve proper hardness; however, in this case, the resilience tends to be low. On the other hand, if the amount of the co-cross-linking agent exceeds 50 parts by mass, the core becomes too hard, thus deteriorating the shot feeling.

Examples of the organic peroxide contained in the rubber composition for a core includes organic peroxides such as dicumyl peroxide, 1,1-bis(t-butylperoxy)-3,5-trimethylcyclohexane, 2,5-dimethyl-2,5-di(t-butylperoxy)hexane and di-t-butylperoxide. Among them, dicumyl peroxide is preferably used. The amount of the organic peroxide is preferably 0.2 to 3 parts by mass, and more preferably 0.3 to 2 parts by mass with respect to 100 parts by mass of the base rubber. If the amount is less than 0.2 parts by mass, the resultant core is too soft, and in this case, the resilience tends to be low. Contrarily, if the amount exceeds 3 parts by mass, it is required to increase the amount of the co-cross-linking agent in order to achieve a proper hardness, leading to decrease the resilience.

Examples of the filler to be contained in the rubber composition for a core include inorganic fillers such as zinc oxide, barium sulfate, calcium carbonate, magnesium oxide, tungsten powder, and molybdenum powder. It is desirable that the amount of the filler is 2 parts by mass or more, and more preferably 3 parts by mass or more, and 50 parts by mass or less, and more preferably 35 parts by mass or less with respect to 100 parts by mass of the base rubber. If the amount of the filler is less than 2 parts by mass, it is hard to adjust the weight of the core. Contrarily, if the amount exceeds 50 parts by mass, the weight proportion of the rubber component becomes small, and in this case, the resilience tends to be low.

The rubber composition for a core may be further blended properly with an organic sulfur oxide, an antioxidant, a peptizing agent, or the like in addition to the base rubber, co-cross-linking agent, organic peroxide, and filler. The amount of the antioxidant is preferably 0.1 parts by mass or more and 1 parts by mass or less with respect to 100 parts by mass of the base rubber. The amount of the peptizing agent is preferably 0.1 parts by mass or more and 5 parts by mass or less with respect to 100 parts by mass of the base rubber.

The conditions of hot-press molding the rubber composition for a core may be properly set in accordance with the rubber composition. Normally, it is preferable that the rubber composition is heated at 130 to 200° C. for 10 to 60 minutes, or alternatively, the rubber composition is heated in two steps where it is heated at. 130 to 150° C. for 20 to 40 minutes, and then, it is heated at 160 to 180° C. for 5 to 15 minutes.

The multi-layered golf ball comprising the intermediate layer of the present invention has also an advantage that it enables to use the core having a large compressive deformation amount of 5.0 mm or less. If the deformation amount of a core is large, a difference in the hardness between the intermediate layer with low hardness and the core is increased and as a result, it is likely that a peeling between the core and the intermediate layer is caused and thus durability is lowered. However, the intermediate layer of the present invention makes it possible to decrease a risk of such a peeling caused by the difference in the hardness. On the other hand, taking the controllability due to the deformation by hit into consideration, the compressive deformation amount of the core is preferably 1.8 mm or more.

In the present invention, in order to produce a golf ball body, the core molded as described above is covered with at least one layer of the intermediate layer described above which is further covered with the cover layer.

When polyurethane is used as a resin component of the resin composition for an intermediate layer, the following steps are carried out, for example. First, components of the resin composition for an intermediate layer are injected into a hemispherical die keeping a core therein. Next, the die is inverted. Then, the die is attached with another hemispherical die including the components of the resin composition for an intermediate layer injected therein, and a curing reaction is carried out so as to form an intermediate layer. The curing reaction of the resin composition for an intermediate layer containing the polyurethane is desirably carried out at 30 to 120° C., and preferably 50 to 80° C. for 2 to 60 minutes, and preferably 5 to 30 minutes.

If ionomer resin, thermoplastic elastomer or the like is used as the resin component of the resin composition for an intermediate layer, the following methods are employed, for example. In one method, components of the resin composition for an intermediate layer is formed into a half shell having a semispherical shape beforehand, and a core is wrapped with two pieces of thus-formed half shells and the resultant is molded under pressure at 110 to 170° C. for 1 to 10 minutes. In another method, the resin composition for an intermediate layer is injection-molded in such a manner that it covers a core.

The cover layer of the golf ball of the present invention is formed of a resin composition having high- hardness and high resilience of a Shore D hardness of 52 or higher in order to achieve an increased ball distance even in a slow swing speed. By using such cover layer as a part of an outer layer, a golf ball having a suppressed spin rate, fast initial speed and a high launch angle is obtained. If a Shore D hardness of the cover layer is lower than 52, the effect of the cation-treated phillosilicate added in the intermediate layer is not fully obtained and a ball distance is decreased, though a shot feeling becomes soft. On the other hand, if a Shore D hardness of the cover layer is higher than 75, the durability by hit is lowered. The hardness of the cover layer is preferably between 55 or higher and 70 or lower, and more preferably between 58 or higher and 65 or lower, and the most preferably between 59 or higher and 62 or lower. Further, the Shore D hardness of the cover layer is higher preferably by 2 or more than that of the intermediate layer, and more preferably by 5 or more.

The thickness of the cover layer of the golf ball of the present invention is not specifically limited, and preferably 0.5 to 3.0 mm, and more preferably 0.8 to 2.5 mm, and further preferably 1.0 to 1.7 mm, when the thickness of the intermediate layer is 0.5 to 2.5 mm. The cover having the thickness of 0.5 mm or more can further improve the durability and the thickness of 3.0 mm or less the resilience.

The resin component in the resin composition for the cover layer in the present invention is not specifically limited, and the same kind of the resin component as used for the intermediate layer may be used. Examples thereof include polyurethane, ionomer resin, polyamide, polyester, polyolefin, polystyrene-based elastomers, and mixtures thereof. It is preferable to select polyurethane or ionomer resin as the main component of the resin component, and ionomer resin is preferably used as a base resin to form the cover layer having high hardness described above.

It is also preferable to use the cover layer comprising a resin composition containing the cation-treated phillosilicate of the present invention. In the present invention, although the intermediate layer having low hardness may improve a shot feeling, the cover layer having high hardness tends to lower the durability.

In order to solve such problem caused by the combination of the soft intermediate layer with the hard cover layer, it is preferable that the cover layer includes the cation-treated phillosilicate of the present invention. As the cation-treated phillosilicate used in the cover layer, the similar phillosilicate having the property obtained by the treatment with quaternary ammonium salt or the like as the cation-treated phillosilicate used for the intermediate layer is preferably employed. The amount of the cation-treated phillosilicate to be blended in the cover layer can be properly selected within the similar range as that in the intermediate layer.

It is preferable for enhancing a ball distance that the cover layer containing the cation-treated phillosilicate described above exhibits the anisotropy in the same manner as the intermediate layer.

It is preferable that, when defining the elasticity modulus in the stretching direction and the elasticity modulus in the compressing direction at the resin portion of the resin composition excluding the cation-treated phillosilicate in the cover layer as $\alpha_0$ and $\beta_0$ respectively, and the elasticity modulus in the stretching direction and the elasticity modulus in the compressing direction at the resin composition containing the cation-treated phillosilicate in the cover layer as $\alpha_1$ and $\beta_1$ respectively, the balance between these elasticity moduli of the cover layer is set in such a manner that the value of $\alpha_1/\beta_1$ is larger than 1.1, and more preferably 1.2 or more, and the most preferably 1.3 or more with respect to the value of $\alpha_0/\beta_0$, because a further increased ball distance is achieved.

It is preferable that the elasticity modulus in the stretching direction is as high as possible, because the balance between the elasticity moduli in both directions has the increased tendency of anisotropy as the elasticity modulus in the stretching direction is higher. However, in order to satisfy both of the spin rate and the abrasion resistance, the balance is preferably 2.0 or less, and more preferably 1.8 or less, and the most preferably 1.6 or less.

The elasticity moduli are properly changeable in accordance with the kinds of the resin components to be used for the cover layer and the amount of the cation-treated phillosilicate. When ionomer resin is used as a resin component, the elasticity modulus in the compressing direction of the resin portion of the resin composition is preferably 20 MPa or higher and 700 MPa or lower, and more preferably 30 MPa or higher and 600 MPa or lower, and the most preferably 50 MPa or higher and 500 MPa or lower.

Similarly, the elasticity modulus in the stretching direction of the resin portion of the resin composition is preferably 100 MPa or higher and 3000 MPa or lower, and more preferably 150 MPa or higher and 2500 MPa or lower, and the most preferably 180 MPa or higher and 2000 MPa or lower.

Meanwhile, elasticity modulus in each direction of a resin composition made of a resin component alone is the same as the resin portion of the resin composition.

Each of the elasticity modulus of the cover layer can be obtained by producing a resin molded piece having the same composition used in the cover layer, if it is difficult to measure the elasticity modulus directly.

The elasticity modulus of the cover layer made of a resin composition containing the above-described ionomer resin as a resin component and the cation-treated phillosilicate is preferably 30 MPa or higher and 800 MPa or lower in the compressing direction, and more preferably 40 MPa or higher and 700 MPa or lower, and the most preferably 55 MPa or higher and 600 MPa or lower. Similarly, the elasticity modulus in the stretching direction is preferably 150 MPa or higher and 3500 MPa or lower, and more preferably 200 MPa or higher and 3200 MPa or lower, and the most preferably 250 MPa or higher and 3000 MPa or lower.

The cover layer of the present invention is formed as an outer layer of the intermediate layer covering the core prepared as described above to obtain a multi-layered golf ball. As the process for preparing the cover layer, the similar process as for the intermediate layer can be used.

In a step of preparing a golf ball body by forming the cover layer, dents called as dimples are normally formed over the surface. The surface of the golf ball body may be further subjected with a polishing treatment such as sand blasting. It is also preferable for the golf ball of the present invention to be normally painted or stamped with marks, in order to give aesthetic appearance and thus increase its commercial value.

In the production methods described above, a thread-wound core may be used for a thread-wound golf ball, for example.

The thread-wound core includes a center, and a thread rubber layer formed by winding thread rubber around the center, and that of a conventionally known type may be used. The center may be either of a liquid-based type (a liquid center) or of a rubber-based type (a solid center). The thread rubber to be wound around the center may be of the same type as those conventionally used in the thread wound layer of a thread wound golf ball, and for example, it is possible to use a thread rubber obtained by vulcanizing natural rubber or a rubber composition prepared by blending natural rubber and synthetic polyisoprene with sulfur, a vulcanizing assistant, a vulcanizing accelerator, an antioxidant, and the like. The thread-wound core is-prepared by winding the thread rubber around the center while stretching the thread rubber about 10 times relative to its original length.

The multi-layered golf ball of the present invention prepared as described above has a diameter of 40 mm or more and 45 mm or less, and preferably 42 mm or more and 44 mm or less. The diameter of 42.67 mm or more and 42.80 mm or less is especially preferable from the point of view of decreasing air resistance within the range satisfying the standards of US Golf Association (USGA). The weight of the golf ball is preferably 40 g or more and 50 g or less, and more preferably 44 g or more and 47 g or less. The weight of 45.00 g or more and 45.93 g or less is especially preferable from the point of view of increasing inertia within the range satisfying USGA Standards.

EXAMPLES

Hereinafter, the present invention will be further described in detail by way of examples. It should be noted that the present invention is not limited to the following examples, and all modifications and embodiments are included within the scope of the present invention as far as they do not depart from the gist of the present invention. In the examples, the amount of each component used is in unit of "parts by mass".

[Hardness]

A hot-press-molded sheet in thickness of 2 mm having a composition of each resin composition was kept at 23° C. for two weeks. Three or more pieces of thus-produced sheets were stacked one upon another and the hardness of the resultant was measured using a spring-type Shore D hardness tester stipulated in ASTM-D2240 by an automatic rubber hardness meter P1 manufactured by Kobunshi Tester Co.

[Elasticity Modulus]

A dynamic viscoelasticity spectrometer Rheogel-E4000 manufactured by UBM Co. was used as a measuring device. A sample piece of 4 mm in width, 30 mm in length, and 0.5 mm in thickness, having a composition of each resin composition of Table 2 was used. The measurement was conducted in a condition where the length of deformed site was determined as 20 mm, and the distribution in the temperatures ranging from −100 to 100° C. (at a temperature raising rate of 2° C./min) was measured at an initial loading of 50 g, an amplitude of 0.025% and frequency of 10 Hz, and the storage elasticity modulus (E') at −50° C. was read and thus-read value was determined as an elasticity modulus in a stretching direction.

A sample piece of 4 mm in width, 40 mm in length, and 0.5 mm in thickness having a composition of each resin composition of Table 2 was used. By use of the same measuring device as described above, the distribution in the temperatures ranging from −100 to 100° C. (at a temperature raising rate of 2° C./min) was measured at an initial loading of 600 g in a thickness direction, an amplitude of 0.5% and frequency of 10 Hz, and the storage elasticity modulus (E') at −50° C. was read and thus-read value was determined as an elasticity modulus in a compressing direction.

A ratio between the elasticity modulus in the compressing direction and the elasticity modulus in the stretching direction $[(\alpha_B/\beta_B)/(\alpha_A/\beta_A)]$ caused by the presence or absence of the reinforcing material was obtained from the comparison between the resin composition containing the reinforcing material and the resin composition made of the same resin component alone.

[Flight Performance]

(1) Launch Angle

A W#1 driver with a metal head was mounted to a swing robot manufactured by True Temper Co. Hitting was carried out at a head speed of 40 m/sec. and the launch angle immediately after hitting was measured. The measurement was carried out five times and an average value was obtained.

(2) Spin Rate

A W#1 driver with a metal head was mounted to a swing robot manufactured by True Temper Co. Hitting was carried out at a head speed of 40 m/sec. and the back spin rate immediately after hitting was measured. The measurement was carried out five times and an average value was obtained.

(3) Ball Distance

A W#1 driver with a metal head was mounted to a swing robot manufactured by True Temper Co. Hitting was carried out at a head speed of 40 m/sec. and the ball distance (m) was measured. The measurement was carried out five times and an average value was obtained.

[Shot Feeling]

An actual hitting test by ten golfers was carried out using a metal head driver W#1. A impact strength or sensation of repulsion imparted by a golf ball upon shot was evaluated according to the following rating criteria. A rating category to which the largest number of golfers agreed for each golf ball was determined as the shot feeling of the golf ball.

○: Good with small impact; and

Δ: Normal.

[Production of Golf Ball]

(1) Production of Core

A rubber composition for a core having a blending ratio shown in Table 1 was mixed, and the resultant was hot-pressed in upper and lower dies each having a semispherical shape at 170° C. for 15 minutes so as to obtain a spherical core.

TABLE 1

| Rubber composition for core | (Parts by mass) |
| --- | --- |
| Polybutadiene rubber | 100 |
| Zinc acrylate | 25 |
| Zinc oxide | 5 |
| Barium sulfate | Proper amount |
| Diphenyldisulfide | 0.5 |
| Dicumylperoxide | 0.7 |
| Diameter (mm) | 37.6 |
| Deformation amount of core | 4.3 |

Polybutadiene rubber: BR18 manufactured by JSR (cis content: 96% or more)
Zinc acrylate: ZNDA-90S manufactured by Nihon Jyoryu Co.
Zinc oxide: Ginrei R manufactured by Toho Zinc Co.
Barium sulfate: Barium sulfate BMH manufactured by Sakai Chemical Industry Co.
Diphenyldisulfide: manufactured by Sumitomo Seika Chemicals Co.
Dicumylperoxide: Percumyl D manufactured by NOF Corp.

(2) Production of resin composition for outer layer (production of half shells)

The materials shown in Table 2 were mixed with each other in a double-shaft mixing type extruder so as to produce a pellet. The extrusion was conducted under the conditions where the screw diameter was 45 mm, the screw rotation speed was 200 rpm, and the screw L/D was 35, and the blended substance was heated at 230° C. at a position of the die of the extruder. A half shell of a predetermined thickness was produced by using thus-prepared pellet.

(3) Production of Outer Layer

The obtained two pieces of half shells each made of the resin composition for an intermediate layer were attached to each other. Then, the half shells were molded by heating under pressure at 130 to 160° C. onto the core obtained in the manner as described above so as to be press-molded to form an intermediate layer of 1.2 mm in thickness.

The half shells for a cover layer were molded by heating under pressure at 140 to 170° C. onto thus-formed intermediate layer so as to form the cover layer, and then, the cover layer was painted. As a result, a golf ball having a cover layer of 1.4 mm in thickness was produced.

TABLE 2

| | Resin composition No. | | | | | | | | | | | | |
| --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 |
| Himilan 1605 | 30 | 30 | 30 | 30 | 30 | 30 | — | — | 40 | 40 | 45 | 45 | 35 |
| Himilan 1706 | 30 | 30 | 30 | 30 | 30 | 30 | — | — | 35 | 35 | 40 | 40 | 35 |
| Himilan 1555 | — | — | — | — | — | — | 50 | 50 | — | — | — | — | — |
| Himilan 1557 | — | — | — | — | — | — | 50 | 50 | — | — | — | — | — |
| Rabalon T3339C | 40 | 40 | 40 | 40 | 40 | 40 | — | — | 25 | 25 | 15 | 15 | 30 |
| Dellite 67G | — | 10 | — | — | — | — | — | — | — | — | — | — | — |

TABLE 2-continued

| | Resin composition No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Dellite 43B | — | — | 10 | — | — | — | — | 5 | — | 10 | — | 20 | — |
| Dellite HPS | — | — | — | 10 | — | — | — | — | — | — | — | — | — |
| Aluminum borate whisker | — | — | — | — | 10 | — | — | — | — | — | — | — | — |
| M1030D | — | — | — | — | — | 10 | — | — | — | — | — | — | — |
| Hardness | 41 | 42 | 42 | 41 | 41 | 41 | 59 | 60 | 53 | 54 | 56 | 57 | 50 |
| Elasticity modulus in stretching direction (MPa) | 600 | 940 | 880 | 800 | 650 | 660 | 1800 | 2200 | 1310 | 1700 | 1550 | 2010 | 1100 |
| Elasticity modulus in compressing direction (MPa) | 115 | 130 | 125 | 120 | 120 | 120 | 400 | 420 | 300 | 320 | 345 | 350 | 260 |
| $(\alpha_B/\beta_B)/(\alpha_A/\beta_A)$ | — | 1.39 | 1.35 | 1.28 | 1.04 | 1.05 | — | 1.16 | — | 1.22 | — | 1.28 | — |

Himilan 1605: Ionomer manufactured by Dupont-Mitsui Polychemical K.K.
Himilan 1706: Ionomer manufactured by Dupont-Mitsui Polychemical K.K.
Himilan 1555: Ionomer manufactured by Dupont-Mitsui Polychemical K.K.
Himilan 1557: Ionomer manufactured by Dupont-Mitsui Polychemical K.K.
Rabalon T3339C: Thermoplastic styrene elastomer manufactured by Mitsubishi Chemical Corporation
Dellite 67G: Bentonite clay manufactured by Laviosa Co.
Dellite 43B: Bentonite clay manufactured by Laviosa Co.
Dellite HPS: Bentonite clay manufactured by Laviosa Co.
Aluminum borate whisker: Alborex YS3A manufactured by Shikoku Chemicals Co. (fibrous reinforcing material surface-treated with aminosilane, length: 20 µm, diameter: 1.0 µm)
M1030D: Nanocomposite manufactured by Unitika Ltd. (phillosilicate without cation treatment)

As is obvious from Table 2, all of the resin compositions Nos. 2 to 4, 8, 10 and 12 of the present invention have a same level of hardness as those of compositions containing a resin alone, showing that an increase of hardness is suppressed in spite of containing the phillosilicate. In comparison of the balance between the elasticity modulus in the compressing direction and the elasticity modulus in the stretching direction, an increasing amount in the stretching direction is larger than the case of using a resin alone. From this result, it is understood that the resin compositions are capable of forming an intermediate layer having the above-described balance of larger than 1.1 with high anisotropy. In particular, it is understood that the resin compositions Nos. 2 and 3 containing the cation-treated phillosilicate treated with quaternary ammonium salt respectively exhibit the balance exceeding 1.3 and are capable of providing an intermediate layer with high anisotropy.

Contrary to the above, the resin composition No. 5 containing aluminum borate whisker which is a conventional reinforcing material exhibits high elasticity modulus in the compressing direction and high elasticity modulus in the stretching direction. However, it exhibits the balance between the elasticity modulus in the compressing direction and the elasticity modulus in the stretching direction at the same level as of the case using a resin alone, and these elasticity moduli merely increase isotropically.

Next, evaluations of the golf balls manufactured by using the resin compositions described above are shown in Table 3.

TABLE 3

| | | Ball No. | | | | | | | | | |
|---|---|---|---|---|---|---|---|---|---|---|---|
| | | Examples | | | | | Comparative Examples | | | | |
| | | a | b | c | d | e | f | g | h | i | j |
| Intermediate layer | Resin composition No. | 2 | 3 | 4 | 3 | 10 | 1 | 5 | 6 | 10 | 12 |
| | Hardness | 42 | 42 | 41 | 42 | 54 | 41 | 41 | 41 | 54 | 57 |
| Cover layer | Resin composition No. | 7 | 7 | 7 | 8 | 9 | 7 | 7 | 7 | 13 | 7 |
| | Hardness | 59 | 59 | 59 | 60 | 53 | 59 | 59 | 59 | 50 | 59 |
| Flight performance | Launch angle (°) | 12.1 | 12.2 | 12.0 | 12.3 | 11.9 | 11.8 | 11.9 | 11.8 | 11.6 | 11.7 |
| | Spin rate (rpm) | 2500 | 2460 | 2510 | 2430 | 2580 | 2600 | 2550 | 2580 | 2700 | 2650 |
| | Ball distance (m) | 225 | 226 | 224 | 227 | 222 | 220 | 222 | 221 | 218 | 219 |
| Shot feeling | | ○ | ○ | ○ | ○ | ○ | Δ | Δ | Δ | Δ | Δ |

As is shown in Table 3, the golf balls Nos. a to e exhibit examples each of which has an intermediate layer formed of a resin composition containing the cation-treated phillosilicate and having a shore D hardness of lower than 55 and a cover layer formed of a resin composition having a shore D hardness of 52 or more. It is understood that these golf balls exhibit higher launch angles, lower spin rates, and longer ball distances, as compared with the golf balls each having an intermediate layer made of an identical resin alone. Further, it is also understood that these golf balls provide more improved shot feelings as compared with those made of a resin alone, while the cover layers have high hardness and high stiffness. Consequently, it is understood that the golf ball obtained in the present invention is capable of achieving both the improved ball distance and shot feeling.

Next, durability was evaluated using the golf ball No. d containing the cation-treated phillosilicate in both an intermediate layer and a cover layer. The evaluation of the durability was conducted as follows: A W#1 driver with a metal head was mounted to a swing robot and each golf ball was hit at a head speed set to 45 m/sec. The number of times at which each golf ball was hit until the golf ball was cracked was measured and the durability of the golf ball against crack was evaluated by means of index based on the golf ball No. f as the index 100. As a result, the index for the golf ball No. d was 120 exhibiting the improved durability.

The golf ball No. d includes a cover layer made of ionomer resin and contains the cation-treated phillosilicate both in a cover layer and in an intermediate layer. It has been confirmed from this test that the improved durability can be imparted to the golf ball even by forming the cover layer having high hardness.

As mentioned above, according to an aspect of the present invention, it is preferable that the resin composition forming the intermediate layer contains 1 part by mass or more and 30 parts by mass or less of the cation-treated phillosilicate with respect to 100 parts by mass of a resin.

It is preferable that a cation to be used in the cation-treated phillosilicate is at least one selected from the group consisting of alkaline metals, alkaline earth metals, and quaternary ammonium salt, and the use of quaternary ammonium salt is especially preferable Further, in the multi-layered golf ball of the present invention, it is preferable that, when the intermediate layer has a thickness of 0.5 mm or more and 2.5 mm or less, the cover layer has a thickness of 0.5 mm or more and 3.0 mm or less.

In the case of applying the resin composition described above for the intermediate layer of the golf ball, in order to achieve a proper balance of elasticity modulus between in a compressing direction and in a stretching direction, when defining an elasticity modulus in a stretching direction and an elasticity modulus in a compressing direction at a resin portion of the resin composition excluding the cation-treated phillosilicate in the intermediate layer as $\alpha_A$ and $\beta_A$ respectively, and an elasticity modulus in a stretching direction and an elasticity modulus in a compressing direction at the resin composition containing the cation-treated phillosilicate in the intermediate layer as $\alpha_B$ and $\beta_B$ respectively, it is preferable that the value of $(\alpha_B/\beta_B)/(\alpha_A/\beta_A)$ is larger than 1.1.

In the present invention, the cover layer has high hardness and high stiffness to provide high resilience and the intermediate layer is formed of the resin composition containing cation-treated phillosilicate. While the phillosilicate is in the form of fine particles having a nano-sized thickness and inherently having a hydrophilic property, the cation treatment of the phillosilicate serves to improve the dispersibility into the resin. The improvement in the dispersibility enables the cation-treated phillosilicate to be present in the state of a primary particle in the form of single leaf in the resin, so that the cation-treated phillosilicate exhibits sufficient effect as a reinforcing material. Due to the features of the cation-treated phillosilicate dispersed in the form of single leaf, the intermediate layer formed by using the resin composition containing the cation-treated phillosilicate exhibits an increasing amount in the elasticity modulus in a stretching direction larger than an increasing amount in the elasticity modulus in a compressing direction, as compared with a resin composition containing a resin alone. This contributes to a rapid recovery from the deformation by hitting and hence to an improvement of the ball distance. In particular, when an intermediate layer made of the resin composition using polyurethane as a resin component is formed, a golf ball having excellent resilience is obtained while thus-formed intermediate layer has low hardness.

In the present invention, although the cation-treated phillosilicate is in the form of fine particles having a nano-sized thickness, it is excellent in dispersibility into a resin. Therefore, an effect of the cation-treated phillosilicate can be sufficiently obtained even if it is added in a small amount ranging from 1 part by mass or more up to 30 parts by mass or less with respect to 100 parts by mass of a resin.

As a cation to be used in the cation-treated phillosilicate, it is preferable to use at least one selected from the group consisting of alkaline metals, alkaline earth metals, and quaternary ammonium salt, because such a cation achieves a good dispersion into a resin. An untreated phillosilicate is difficult to be dispersed into a resin having high polarity of hydrophobic property, since such untreated phillosilicate has high hydrophilic property. However, according to the present invention, the cation-treated phillosilicate is capable of dispersing even into such a resin having high polarity, for example, into polyurethane.

This application is based on Japanese Patent Application No. 2004-253975 filed on Sep. 1, 2004 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A golf ball comprising a core, an intermediate layer for covering the core and a cover layer for covering the intermediate layer, wherein said cover layer is formed of a first resin composition having a Shore D hardness of 52 or higher and said intermediate layer is formed of a second resin composition containing a cation-treated phillosilicate and having a Shore D hardness of lower than 55, and a cation of said cation-treated phillosilicate is a quaternary ammonium salt.

2. The golf ball according to claim 1, wherein said second resin composition forming the intermediate layer contains 1 part by mass or more and 30 parts by mass or less of said cation-treated phillosilicate with respect to 100 parts by mass of a resin.

3. The golf ball according to claim 1, wherein said intermediate layer has a thickness of 0.5 mm or more and 2.5 mm or less and said cover layer has a thickness of 0.5 mm or more and 3.0 mm or less.

4. The golf ball according to claim 1, wherein, defining an elasticity modulus in a stretching direction and an elasticity modulus in a compressing direction at a resin portion of said second resin composition excluding the cation-treated phillosilicate in the intermediate layer as $\alpha_A$ and $\beta_A$ respectively, and an elasticity modulus in a stretching direction and an elasticity modulus in a compressing direction at said second resin composition containing the cation-treated phillosilicate in the intermediate layer as $\alpha_B$ and $\beta_B$ respectively, the value of $(\alpha_B/\beta_B)/\alpha_A/\beta_A)$ is larger than 1.1.

5. The golf ball according to claim 1, wherein at least one substituent group of said quaternary ammonium salt is an aromatic hydrocarbon group or carboxylic group.

\* \* \* \* \*